Figure 1:
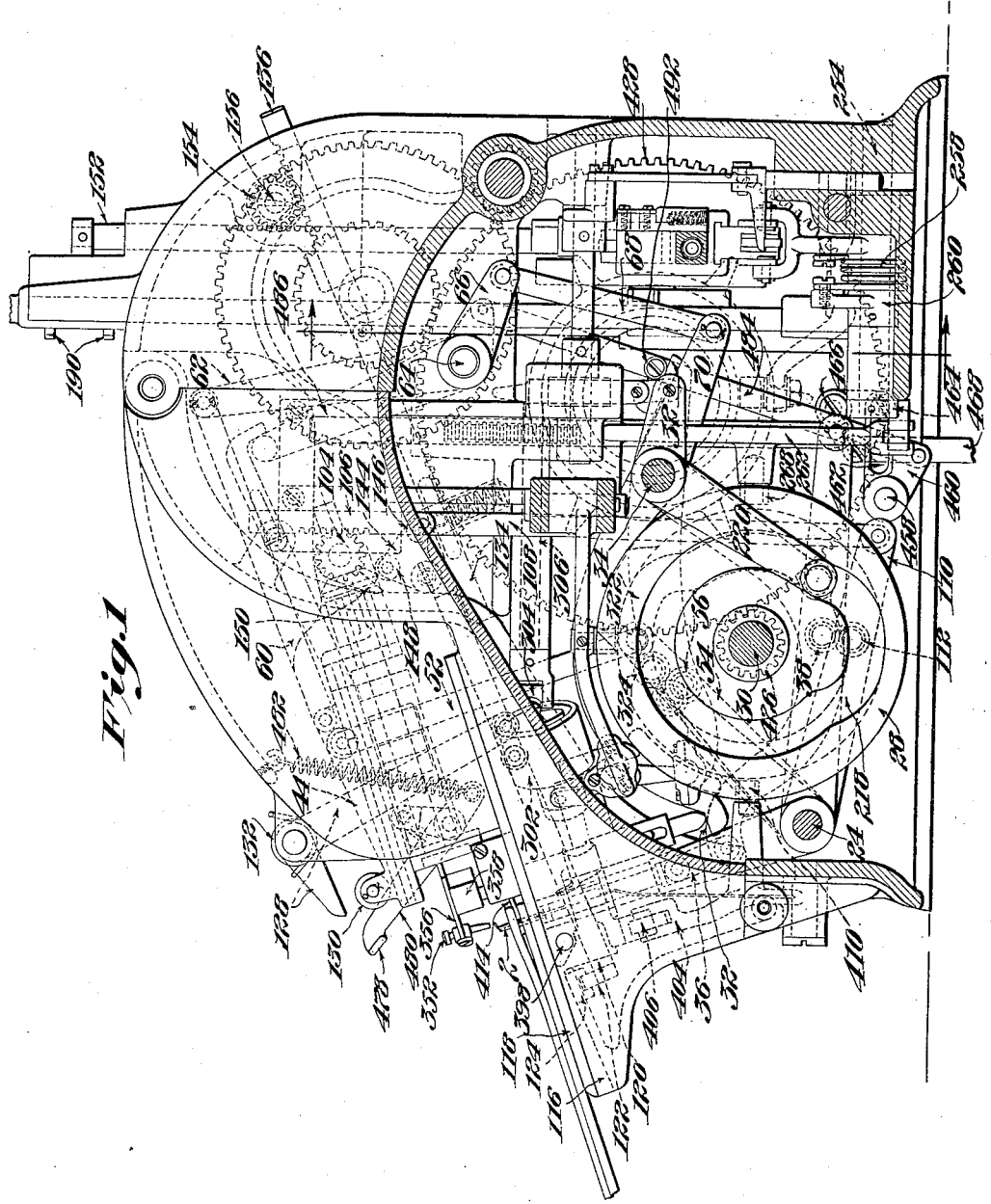

April 28, 1931. H. E. ENSLIN 1,803,308
MACHINE FOR LACING SHOE UPPERS
Filed July 21, 1921 10 Sheets-Sheet 1

April 28, 1931. H. E. ENSLIN 1,803,308
MACHINE FOR LACING SHOE UPPERS
Filed July 21, 1921 10 Sheets-Sheet 4
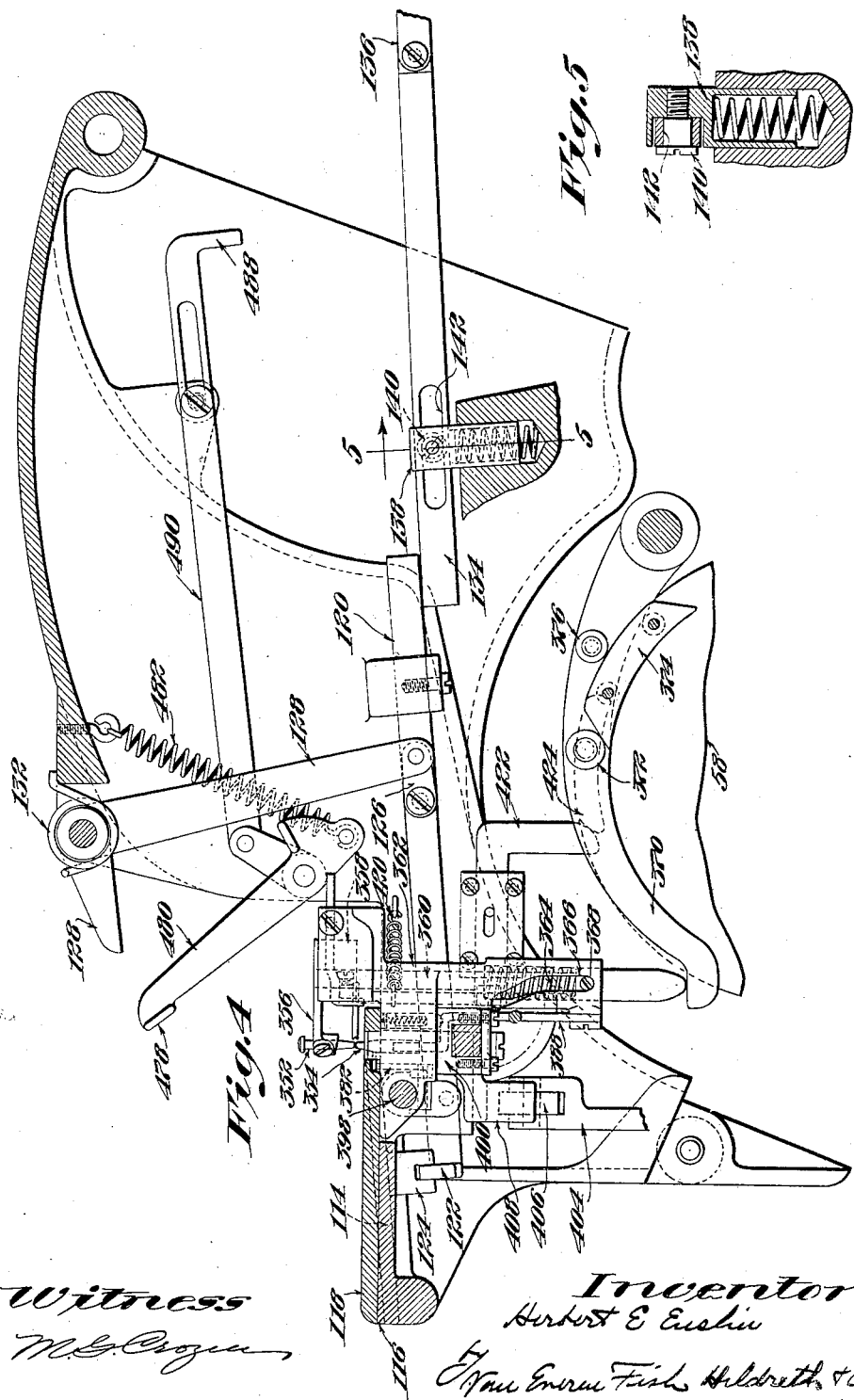

April 28, 1931.   H. E. ENSLIN   1,803,308
MACHINE FOR LACING SHOE UPPERS
Filed July 21, 1921   10 Sheets-Sheet 5
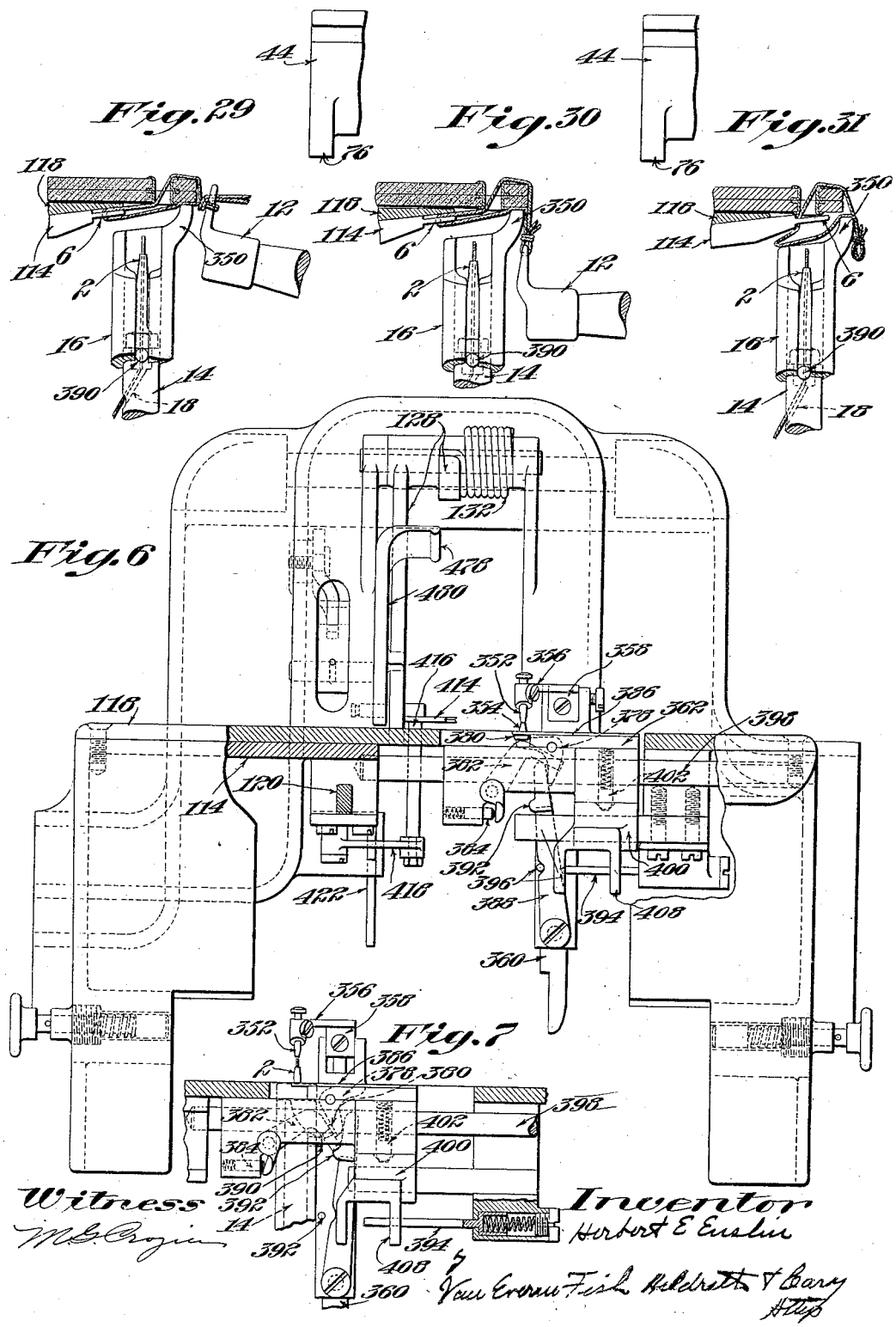

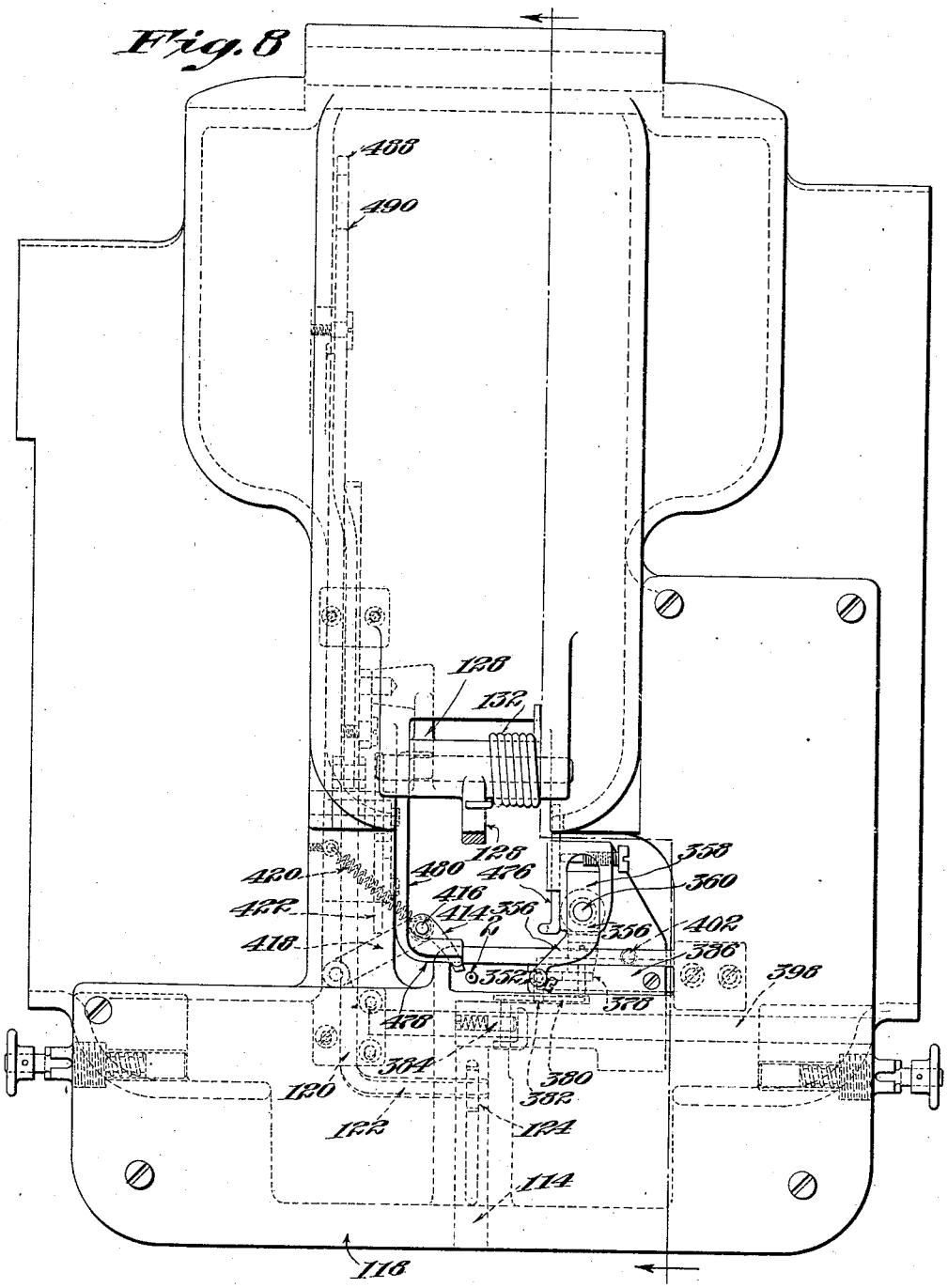

April 28, 1931.  H. E. ENSLIN  1,803,308
MACHINE FOR LACING SHOE UPPERS
Filed July 21, 1921  10 Sheets-Sheet 7
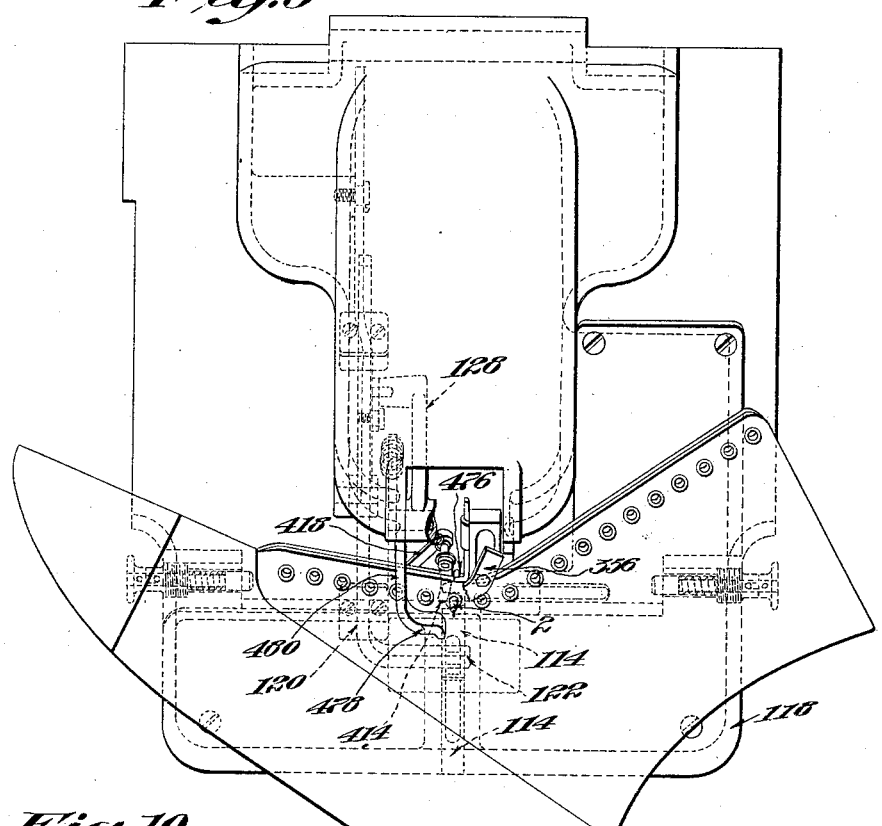
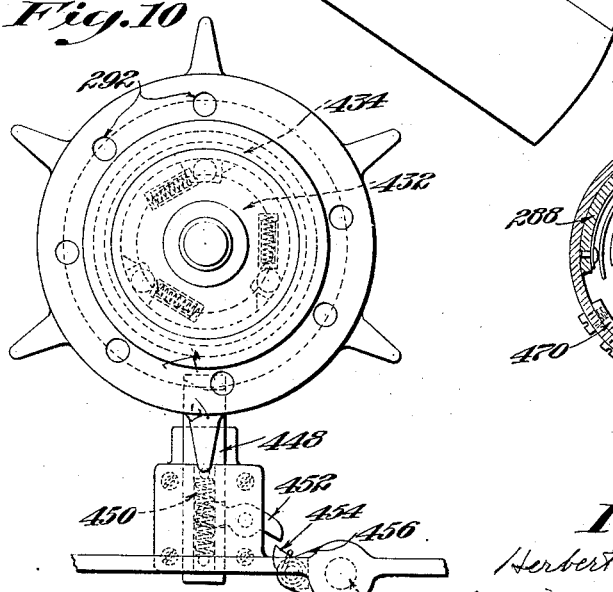
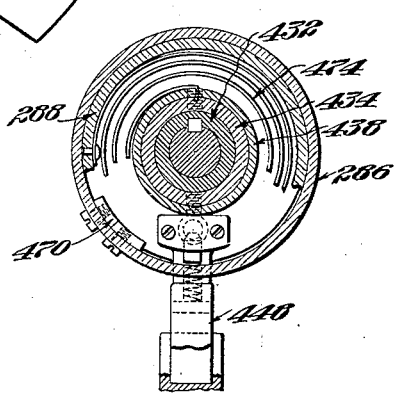
Inventor
Herbert E. Enslin
by Van Evera Fish Hildreth & Cary
Attys
Witness April 28, 1931.   H. E. ENSLIN   1,803,308
MACHINE FOR LACING SHOE UPPERS
Filed July 21, 1921   10 Sheets-Sheet 8
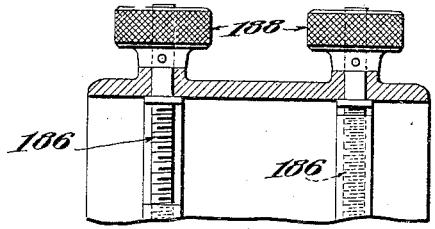
Fig.12
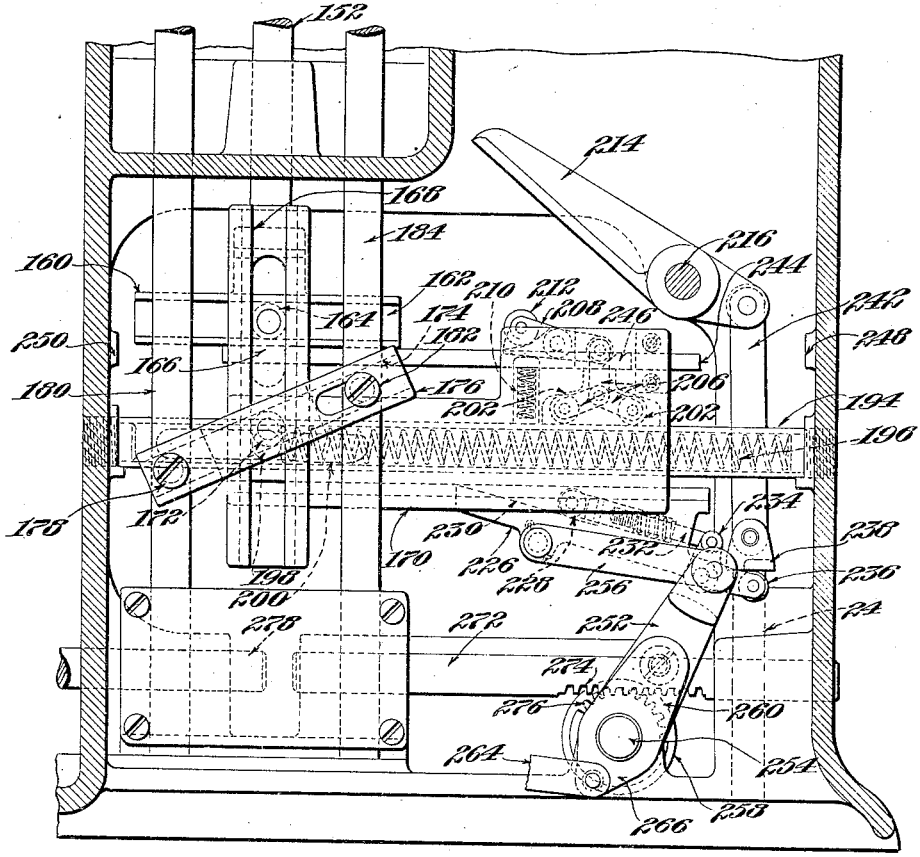
Fig.13
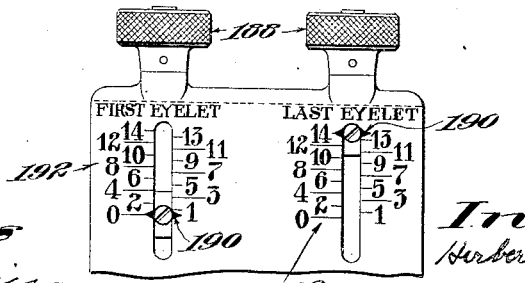
Witness
M. G. Crozier
Inventor
Herbert E. Enslin
by Van Everen Fish Hildreth & Leary
Attys April 28, 1931. H. E. ENSLIN 1,803,308
MACHINE FOR LACING SHOE UPPERS
Filed July 21, 1921   10 Sheets-Sheet 9
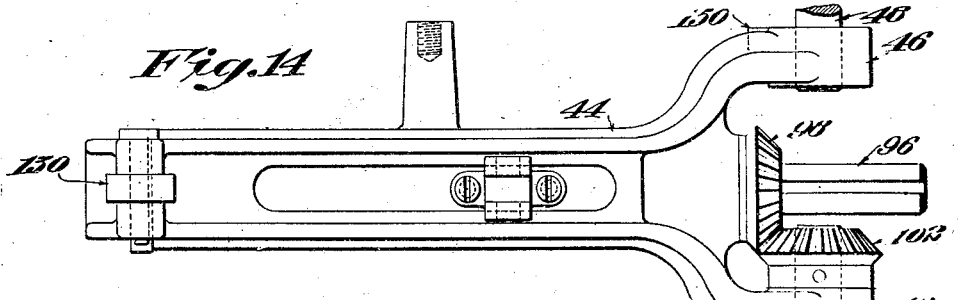
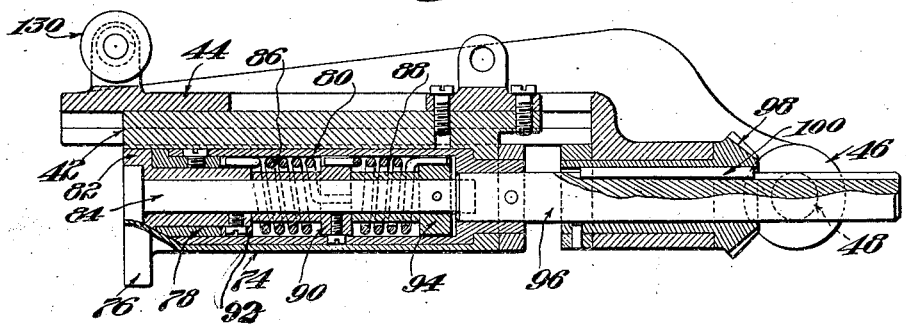
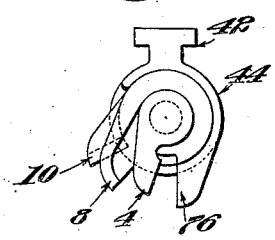
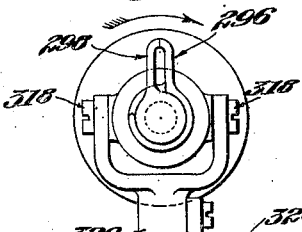
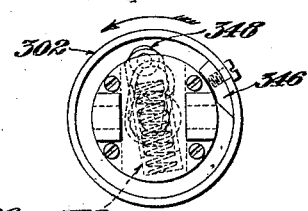
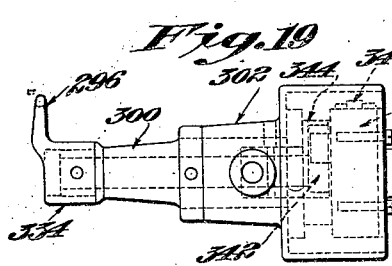
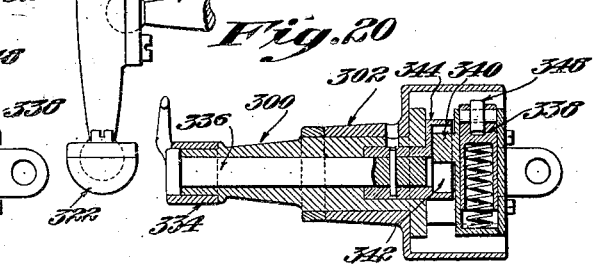
Witness
M. G. Crogan
Inventor
Herbert E. Enslin
by Wm. Evarts Fish Hildreth & Cary
Attys April 28, 1931.                H. E. ENSLIN                1,803,308
MACHINE FOR LACING SHOE UPPERS
Filed July 21, 1921          10 Sheets-Sheet 10
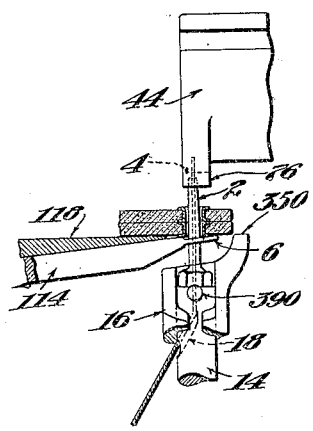
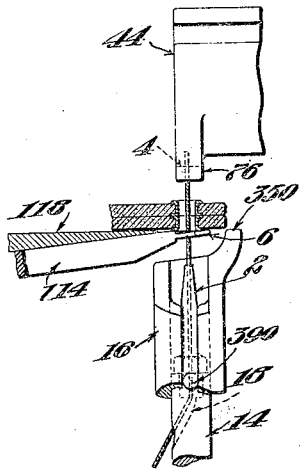
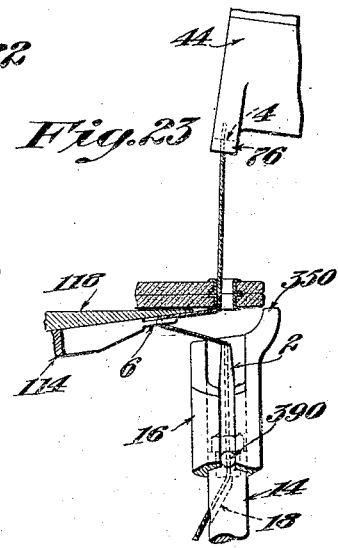
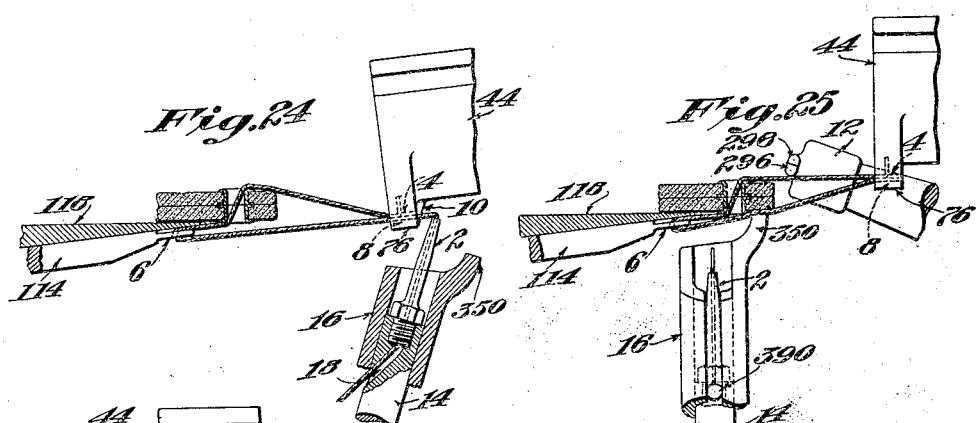
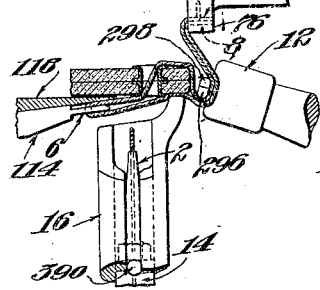
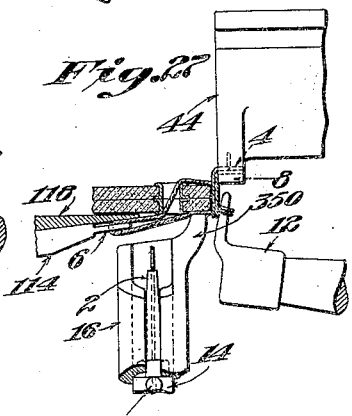
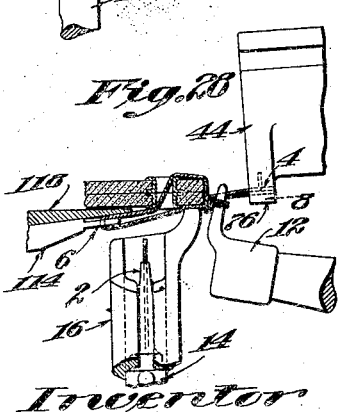
Inventor
Herbert E. Enslin Patented Apr. 28, 1931

1,803,308

UNITED STATES PATENT OFFICE

HERBERT E. ENSLIN, OF BEVERLY, MASSACHUSETTS, ASSIGNOR TO UNITED SHOE MACHINERY CORPORATION, OF PATERSON, NEW JERSEY, A CORPORATION OF NEW JERSEY

MACHINE FOR LACING SHOE UPPERS

Application filed July 21, 1921. Serial No. 486,424.

The invention relates to machines for lacing shoe uppers and more particularly to machines in which the pairs of eyelets to be laced are presented successively to the lace-inserting mechanism.

The machine in which the invention has been embodied comprises a lace-inserting mechanism which operates to connect each pair of eyelets presented to it by an individual lacing, and a work feeding mechanism which automatically presents the pairs of eyelets to be laced successively to the lace-inserting mechanism.

The lace-inserting mechanism inserts and ties a closed loop which ties together a pair of eyelets and is unconnected with the loops connecting other pairs of eyelets and, therefore, accurately and uniformly determines the distance to which that pair of eyelets may be separated when the shoe is lasted. In doing certain classes of work it is desirable that the space between the edges of the quarters of the lasted shoe should gradually increase from the lower pairs of eyelets upward and an important feature of the invention consists in the provision of means for varying the lengths of the lacings inserted in the successively presented pairs of eyelets to secure this result. By regulating the variation in the lengths of the individual lacings inserted any desired relation between the edges of the quarters of the lasted shoes may be uniformly secured.

In lacing the quarters of shoes which are provided with a tongue, one edge of which is secured to one of the quarters, the tongue is liable to lie between a pair of eyelets and thus interfere with the proper insertion of the lacing. This may be avoided by another feature of the invention which comprises means for removing the tongue from between each pair of eyelets prior to the passing of the lacing therethrough. This means in the embodiment shown consists of a finger arranged to move between the quarters and to remove the tongue in case it lies between the eyelets as they are brought into position for the insertion of the lacing.

In addition to the features outlined above the invention also includes further features and combinations contributing to the simplicity and efficiency of the operation of the machine in which they are embodied and which will be hereafter described and referred to in the claims.

Figure 2:
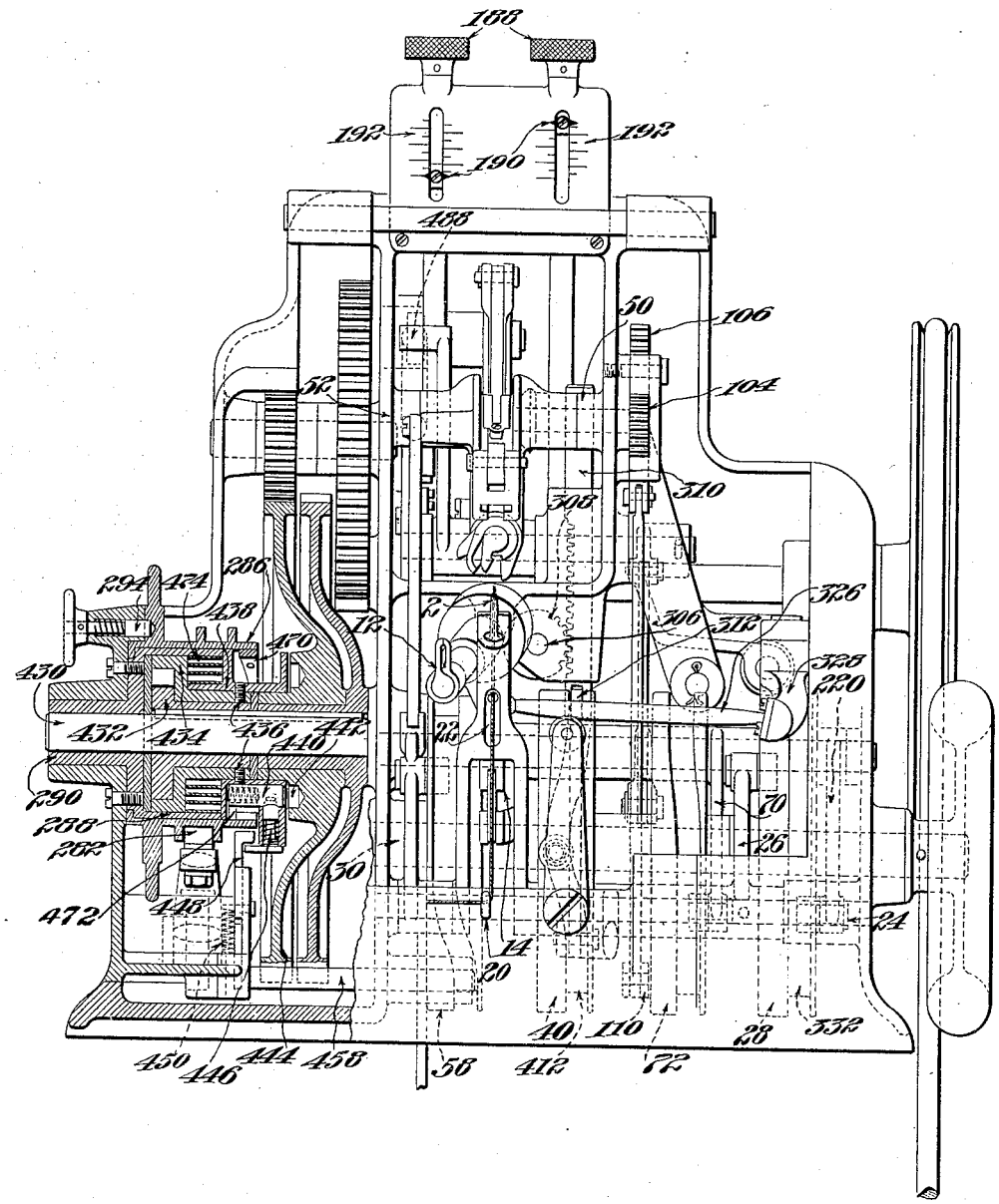
Figure 3:
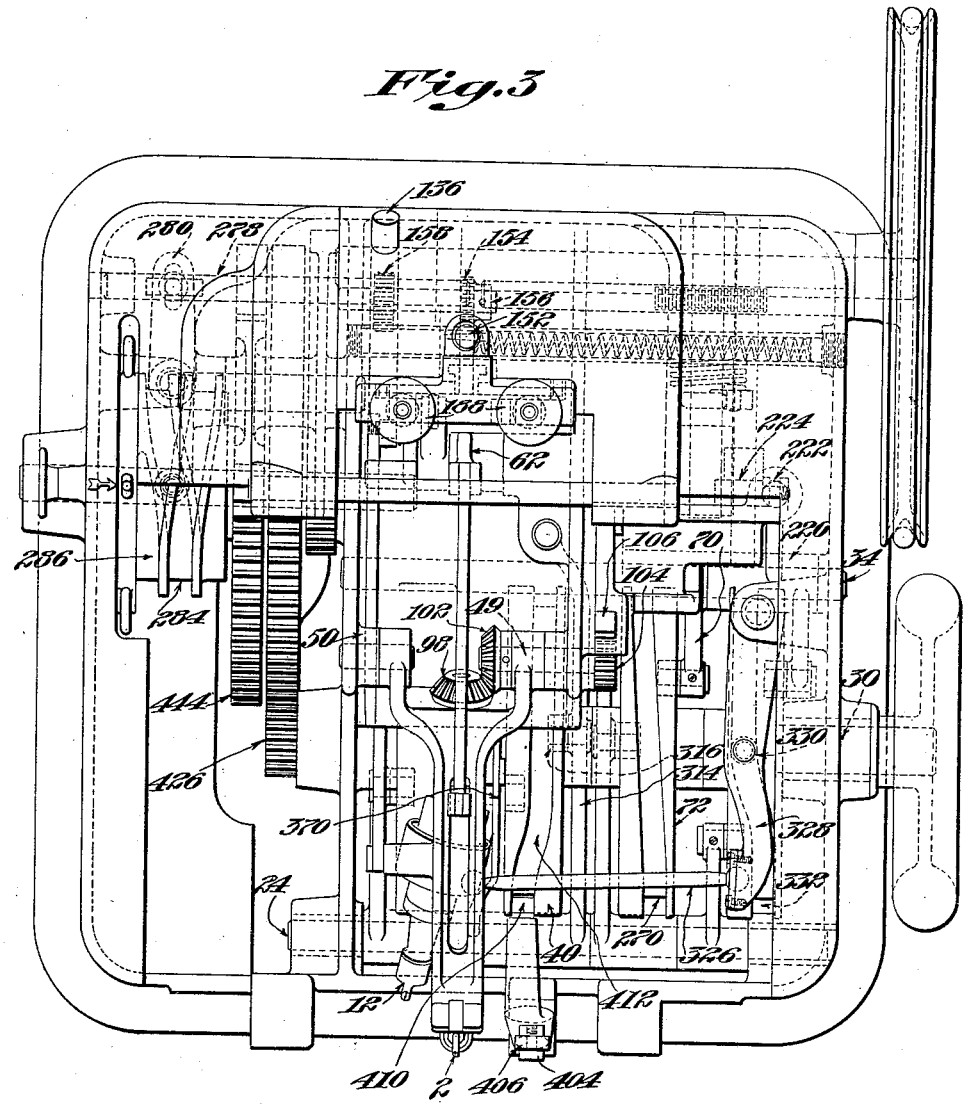

A machine embodying one form of the invention is shown in the accompanying drawings in which Fig. 1 is a side elevation partly in section, Fig. 2 is a front elevation with the casing cap and parts mounted thereon removed, Fig. 3 a plan view with the same parts removed, Fig. 4 a sectional elevation showing the casing cap and parts carried thereby, Fig. 5 a sectional view on line 5, Fig. 4, Fig. 6 a front view partly in section of the casing cap and parts carried thereby, Fig. 7 a detail view of a part of the feed mechanism, Fig. 8 a top view of the casing cap and parts carried thereby, Fig. 9 a plan view of the casing cap and parts carried thereby showing a shoe upper in position, Figs. 10 and 11 details of the driving and stopping mechanism, Figs. 12 and 13 details of the mechanism for controlling the lengths of the lacings, Figs. 14, 15 and 16 details of the lace-inserting mechanism, Figs. 17 to 20 inclusive details of the knot-tying mechanism, and Figs. 21 to 31 inclusive a series of diagrammatic views showing the mode of operation of the machine for inserting an individual lacing which consists of a length of lacing cord, the ends of which are tied together to form a closed loop connecting the eyelets.

As shown in the drawings the lace-inserting mechanism comprises a hollow spindle 2 which passes the free end of a cord through a pair of eyelets, a gripper 4 which seizes the free end of the cord and cooperates with a measuring plate or take-up 6 and with the spindle in drawing a measured length of cord through the spindle and in bringing the cord on opposite sides of the eyelets together, a second gripper 8 which seizes the cord near the spindle, a cutter 10 which severs the cord between the spindle and the second gripper, and a knotter 12 which ties the ends of the length of the cord together to form a closed loop connecting the eyelets.

The spindle is secured in the upper end of a spindle carrier 14 which is mounted to reciprocate in a support 16 and is provided near its upper end with a cord passage 18 communicating with the lower end of the spindle. The cord leads from a suitable cord supply through a guide 20 and through a slot 22 in the support 16 to the passage 18 and up through the spindle from the upper end of which it projects as indicated in Figs. 1, 2 and 21. The lower end of the support 16 for the spindle carrier is secured upon a rock-shaft 24 which is oscillated through a lever 26 carrying a roll which engages a cam groove formed in the cam disk 28, which is secured to the cam shaft 30 of the machine. The spindle carrier is reciprocated in the support to advance and retract the spindle through a lever 32 pivotally supported upon a shaft 34 and connected to the spindle carrier by a link 36. The lever carries a cam roll 38 engaging a groove formed in the side of the cam disk 40 which is carried by the cam shaft 30.

The cord grippers 4 and 8 and the cutter 10 are carried in a slide 42 which is mounted to reciprocate in guideways formed in a vertically movable support 44. The rear end of the support is provided with bearings 46 supported on shafts 48 and 49 which are in turn mounted in fixed bearings 50 (Figs. 2, 3, 14 and 15). The support is swung vertically about the supporting shafts 48 and 49 through a link 52 which connects the support with a cam lever 54 carrying the roll 56 which engages a cam groove formed in the side of a cam disk 58 carried by the cam shaft 30. The slide 42 is moved forward and back in the support through a link 60 connecting the slide with the upper end of an arm 62 carried by a rock-shaft 64 which also carries an arm 66 connected by a link 68 with one arm of a lever 70, the other arm of which carries a roll engaging a cam groove formed in a cam disk 72 carried by the cam shaft 30 (Figs. 1 and 2).

The grippers 4 and 8 and the cutter 10 are mounted in a cylindrical bearing 74 formed on the slide 42 and cooperate with a fixed jaw 76 formed at the forward end of the bearing in gripping and severing the cord (Figs. 14, 15 and 16). The cutter 10 is in the form of a blade carried on the forward end of a sleeve 78 which is secured in the outer end of a sleeve 80 mounted to turn within the bearing 74. The gripper 8 is formed on the forward end of a sleeve 82 mounted to turn within the sleeve 78 and the gripper 4 is formed on the forward end of a shaft 84 mounted to turn within the sleeve 82. The grippers and cutter are normally held in the step relation to each other indicated in Fig. 15 by springs 86 and 88. The spring 86 connects a collar 90 which is secured to the sleeve 80 with a collar 92 which is secured to the sleeve 82 and thus yieldingly connects the gripper 8 with the cutter carrying sleeve.

The spring 88 connects the collar 90 with a collar 94 secured to the shaft 84 and thus connects the cutter carrying sleeve 80 with the gripper 4. The cutters and grippers are actuated through a shaft 96 secured to and forming an extension of the cutter sleeve 80. This shaft passes through a beveled gear 98 mounted in the support 44 and connected with the shaft by a feather 100 which permits the shaft to slide back and forth through the gear. The shaft 49 about which the support turns carries on its inner end a beveled gear 102 engaging the gear 98 and on its outer end a pinion 104 which is engaged by a vertically sliding rack 106 (Figs. 1, 2 and 3). The lower end of the rack is connected by a link 108 with the end of a cam lever 110 which carries a roll 112 engaging a cam groove formed in the cam disk 7. Through these connections the cam oscillates the shaft 96 and cutter carrying sleeve to actuate the cord cutter and grippers. When the shaft and sleeve are moved in a direction to bring the grippers and cutter into action upon the cord the grippers and cutters move together toward the jaw 76 until the gripper 4 is brought against the jaw. Further rotation of the shaft and cutter sleeve brings the gripper 8 against the jaw 76, the spring 86 yielding to permit further movement of the cutter sleeve. During the further movement of the cutter sleeve which carries the cutter blade across the rear face of the jaw 76 both the springs 86 and 88 yield and continue to press the grippers 4 and 8 against the jaw 76. When the shaft and cutter sleeve are moved in the opposite direction the cutter blade and grippers are retracted to their initial positions indicated in Fig. 16.

The cord measuring plate 6 which cooperates with the spindle and cord gripper in determining the length of cord drawn through the spindle during each lace-inserting cycle is in the form of a laterally projecting take-up finger formed on the forward end of a slide 114 and normally lying just back of the path of the spindle in passing up through the eyelets as indicated in Figs. 9 and 21. The take-up slide 114 is mounted for forward and backward movement in a guideway formed in the casing cap 116 and the under side of a work supporting plate 118 (Figs. 1 and 4). The slide is actuated through a bar 120 mounted to slide in guides in the casing cap and provided with a laterally projecting lug 122 engaging a slotted lug 124 on the slide. Bar 120 is connected by a link 126 with one arm of a bell crank lever 128, the other arm of which is arranged to be acted upon by a roll 130 on the support 44 when the support is raised to move the cord carrying gripper 4 upward after it has grasped the end of the lacing cord passed through the eyelets by the spindle. The engagement of the roll with the bell crank lever 128 rocks the lever in a direction to retract the take-up slide so that the take-up draws out a bite of cord between the upper end of the then retracted spindle and the eyelets, as indicated in Fig. 23. A spring 132 acts upon the lever 128 and tends to return the take-up to its initial position when the lever is released. The extent to which the take-up is thus moved by the spring and therefore the amount of cord finally retained by it and entering into the lacing loop is determined by a controlling stop bar 134 arranged to move up into position back of the bar 120 when this bar is advanced. The rear end of the stop bar is pivotally connected to a rack bar 136 and the forward end is supported by a spring operated plunger 138 carrying a guide screw 140 which engages a slot 142 in the bar. When the bar 120 is in retracted position its rear end overlies the forward end of the stop bar as indicated in Fig. 4. When the bar 120 is moved to retract the take-up the forward end of the stop bar is moved up into position back of the bar 120 by the spring plunger 138 and arrests the return movement of the bar 120 and the take-up when the lever 128 is released. The take-up bar is retained in this position by the stop bar until the completion of the lace-inserting cycle and then the stop bar is depressed to release the bar 120 and permit the spring 132 to return the take-up to its initial position preparatory to the next lace-inserting cycle. The stop bar is thus moved to release the take-up through a lever 144 carrying a roll 146 arranged to engage the upper end of the plunger 138 and also a roll 148 arranged to be engaged by an arm 150 on the left hand bearing 46 of the support 44. At the completion of the cycle the support is given an additional downward movement which causes the arm 150 to rock the lever 144 and thus depress the stop bar 134 to release the take-up.

The length of the lacing inserted in any lace-inserting cycle is determined by the amount of thread drawn off and retained by the take-up during that cycle and the length of the lacing inserted may, therefore, be varied by varying the amount of thread thus measured off by the take-up. The means in the construction shown for thus determining the length of the lacing comprises means for controlling the position of the stop bar 134 during each lace-inserting cycle. This means is so constructed that it may be adjusted to secure the same length of lacing during successive lace-inserting cycles or may be adjusted to secure any desired variation in the lengths of the lacings inserted in successive cyles. The mechanism for controlling the position of the stop bar and thus the length of the lacing inserted comprises a vertically sliding rod 152 provided with a rack engaging a pinion 154 secured to one end of a shaft 156, the other end of which carries a similar pinion 158 engaging a rack on the bar 136 to which the stop bar is connected (Figs. 1 and 3). The lower end of the rod 152 carries a crosshead 160 which is provided with a horizontal guideway 162 (Fig. 12). The guideway is engaged by a roll 164 mounted on the rear side of a block 166 which is mounted to slide in a vertical guideway 168 formed at one end of a horizontal slide 170. The block 166 also carries on its front face a roll 172 which engages a groove 174 formed in the rear face of an adjustable controller bar 176. One end of the controller bar is connected by a pivot screw 178 with a vertically movable adjusting rod 180. The other end of the controller bar is connected by a pivot screw 182 with a vertically movable adjusting rod 184 and this end of the bar is slotted so that it may slide as well as swing on the pivot screw. By vertical adjustment of the rods 180 and 184 the ends of the controller bar may be independently adjusted to vary the height or inclination of the bar. Vertical movement of the controller bar will result in a vertical movement of the block 166 and the rod 152 and consequently a lengthwise movement of the stop bar 134 which will vary the position of the take-up during the lace-inserting cycle and consequently the length of the lacing inserted. If the controller bar is adjusted into a horizontal position, movement of the slide 170 and the block 166 will not result in any vertical movement of the block 166 and will not, therefore, result in any change in the position of the stop bar. If, however, the controller bar is adjusted into an inclined position then horizontal movement of the slide 170 will result in a vertical movement of the block 166 and rod 152 and consequently a change in the position of the stop bar. This change will be a progressive change so long as the movement of the slide 170 continues in the same direction. One end of the controller bar may, therefore, be adjusted in accordance with the length of lacing which is to be inserted in the first pair of eyelets of a series to be laced and the other end of the controller bar be adjusted in accordance with the length of lacing to be inserted in the last pair of eyelets of the series to be laced and in case these lengths vary a progressive variation from the length inserted in the first pair of eyelets to the length inserted in the last pair of eyelets may be secured by moving the slide 170 step by step to transfer the roll 172 from the end of the controller bar corresponding to the first pair of eyelets to the other end of the bar corresponding to the last pair of eyelets, the number of steps depending upon the number of pairs of eyelets to be laced. The means for vertically adjusting the rods 180 and 184 to position the ends of the controller bar consists of screws 186 threaded into the upper ends of the rods and provided with operating heads 188 at their upper ends. The rods may carry pointers 190 travelling over scales 192 which may indicate in 16ths of an inch the space between the edges of the laced quarters of the lasted shoe at the first and last of the laced eyelets which will result from the indicated adjustment of the controller bar.

The slide 170 is mounted for movement on a hollow guide bar 194 and is forced toward the left in Fig. 12 by a spring 196 arranged within the bar and engaging a pin 198 which projects from the slide through a slot 200 in the bar. The slide is locked in any position to which it may be moved on the bar by clamping rolls 202 arranged to wedge between the bar and inclined surfaces 204 on the slide. These locking rolls are connected by links 206 with a lever 208 which is forced in a direction to press the rolls into clamping position by a spring operated plunger 210. The lever also carries a roll 212 arranged to be engaged by a clamp releasing lever 214 which is mounted on a rock-shaft 216. The rock-shaft is operated to release the slide during the operation of the mechanism which feeds the slide forward a step for each lace-inserting cycle. The rock-shaft is thus operated by a cam groove 218 formed in the cam disk 28 and engaging a roll on one arm of a lever 220, the other arm of which is connected by a link with the lower end of a rack 222 which engages a pinion 224 on the shaft (Figs. 1 and 3). The means for giving the slide 170 its step by step movement comprises a feed slide 226 mounted in a guideway in the slide 170 and carrying a clutch roll 228 which is forced against the surface of the guideway and an inclined surface 230 on the feed slide by a spring pressed rod 232. The rear end of the rod is connected to one arm of the bell crank lever 234 which is pivoted on the feed slide and the other arm of which carries a roll 236 adapted to be engaged by an arm 238 projecting from the upper end of a vertically movable rod 240. The rod is connected by a link 242 with the clamp releasing lever 214 so that the rod 240 is depressed to withdraw the clutch roll 228 from active position after the lever has been raised to release the clamping rolls 202, 204 so that they will lock the slide 170 in position on the guide bar 194. So long as the clamping rolls are free to act the release of the clutch roll 228 has no effect upon the slide 170 since the clamping rolls prevent its movement on the bar 194 under the influence of the spring 196. Means is provided, however, for withdrawing the clamping rolls during the feeding movement of the slide 170 which occurs at the end of the cycle which inserts the lacing in the last of the series of eyelets to be laced so that these rolls are inactive to hold the slide 170 when the clutch roll 228 is withdrawn at the end of this cycle, the result being that the withdrawal of the roll 228 frees the slide 170 so that it is returned to initial position by its spring 196 preparatory to lacing the next series of eyelets. The means for thus releasing the clamping rolls at the end of the last lace-inserting cycle of a series comprises a bar 244 mounted in the slide 170 and provided with a cam lug 246 for acting on the end of the roll releasing lever 208. During the movement of the slide 170 at the end of the last lace-inserting cycle the end of the bar 244 strikes a boss 248 on the frame of the machine so that the cam lug 246 is forced under the end of the lever 208 and withdraws the clamping rolls 202 and 204 from active position. At the same time the clutch roll 228 is rendered inactive by engagement of the arm 238 with the roll 236 so that the slide 170 is free to be returned to its initial position. As the slide reaches its initial position the opposite end of the bar 244 strikes a boss 250 on the machine casing and is shifted to disengage the cam lug 246 from the lever 208 so that the clamping rolls return to active position.

The mechanism for reciprocating the feed slide 226 comprises a lever 252 loosely mounted on a rock-shaft 254 and connected by a link 256 with the slide. The lever is yieldingly connected by a coiled spring 258 with an arm 260 secured to the rock-shaft 254 so that motion is transmitted from the rock-shaft to the lever through the spring. The rock-shaft is actuated through a lever 262 connected by a link 264 with an arm 266 secured to the rock-shaft and also provided with a roll 268 engaging a cam groove 270 formed in the cam disk 72. The cam and connections are proportioned to reciprocate the feed slide 226 through a distance sufficient to give the slide 170 its maximum movement. This is the movement which should be given to the slide 170 at the end of the first lace-inserting cycle in case but two pairs of eyelets are to be laced together in order that the cord measuring take-up may be positioned in accordance with the setting of the controller plate 174 for the last eyelet which, in this case, is the second eyelet. If three pairs of eyelets are to be laced the slide 170 should be moved through this distance in two steps instead of one and the feeding movement of the feed slide 226 should be correspondingly decreased. If four pairs of eyelets are to be laced the slide 170 should be moved through this distance in three steps and so on, the distance through which the slide 170 should be moved at each step decreasing with each increase in the number of pairs of eyelets to be laced.

The means for regulating the feeding action of the slide 226 in accordance with the number of pairs of eyelets in the series to be laced comprises a controller rod 272 provided with a rack 274 engaging gear teeth 276 formed on the hub of the lever 252. A stop bar 278 is arranged to cooperate with the end of the controller rod 272 in determining the movement transmitted to the feed slide 226 from the rock-shaft 254. The feed slide will be advanced to the same point during each oscillation of the rock-shaft but the length of its return movement, and therefore of its reciprocation, will be limited and controlled by the position of the controlling stop bar 278. By adjustment of this bar the movement of the feed bar may be prevented or its feeding stroke varied in accordance with the number of pairs of eyelets to be laced. In order that the bar 278 may be readily and conveniently adjusted it is connected by a pin and slot connection to the rear end of a lever 280, the front end of which carries a roll 282 engaging a cam 284 formed on an adjustable cam drum 286 (Figs. 1, 2 and 3). The drum is mounted to turn about a flange 288 projecting from a bearing 290 which is secured to the machine frame. The cam drum is provided with a series of holes 292 corresponding to the different adjustments of the controller bar and arranged to be engaged by a spring pressed locking pin 294 (Figs. 2 and 10). The proper setting of the cam drum for the successive lacing of different numbers of pairs of eyelets may be indicated on the cam drum so that the proper setting of the controller bar will be insured.

The knotter 12 comprises a pair of looping and cord drawing fingers 296 and 298 which extend laterally from the forward end of a rotary head 300 (Figs. 17 to 20). The rotary head is mounted in a vertically and laterally movable support 302 and the rear end of the head is connected by a universal joint 304 with the forward end of a shaft 306, the rear end of which carries a gear segment 308 engaged by a rack bar 310 (Figs. 1 and 2). The lower end of the rack bar is connected by a link 312 with a lever 314 which carries a cam roll 316 engaging a cam groove formed in the cam disk 40. The support 302 is mounted upon trunnions 318 in the upper end of a lever 320, the lower end of which is supported by ball and socket joint on the end of a vertically movable cam lever 322. The cam lever carries a roll 324 engaging a cam groove formed in the side of the cam disk 58. The lever 320 is moved laterally through a link 326 which connects the lever with the end of a cam lever 328 carrying a cam roll 330 engaging a cam groove 332 in the disk 28.

The looper finger 296 is formed on a sleeve 334 which is secured to the forward end of the rotary head 300 while the looper finger 298 is formed on the forward end of a shaft 336 mounted in the head. The finger 298 is normally held in engagement with the finger 296 as indicated in Fig. 17 by a spring pressed plunger 338 mounted in the head and provided with a projecting pin 340 engaging a slot 342 formed in an arm 344 which is secured to the rear end of the shaft 336. The slot is so shaped that a movement of the spring pressed plunger against the force of the spring will separate the finger 298 from the finger 296, thus opening the fingers to receive a bite of the lacing cords between them during the knot-tying operation. The fingers are recessed within their contacting ends to apply a proper frictional grip to the cord in tightening the knot in a manner to be described. The spring plunger is moved to separate the looper fingers at the proper time in the knot-tying operation by a cam 346 secured to the support 302. The rotation of the head 300 during the knot-tying operation brings a roll 348 on the plunger into engagement with the cam which then acts to force the plunger inward and separate the looper fingers.

The mode of operation in inserting a lacing is illustrated in Figs. 21 to 31 inclusive. The spindle 2 carries the end of the lacing cord through a pair of eyelets and the free end of the cord which projects from the upper end of the spindle is grasped by the gripper 4 as indicated in Fig. 21. The spindle then retracts as indicated in Fig. 22, after which the carrier 44 rises so that the gripper 4 draws cord through the spindle and eyelets. At the upper end of its movement the carrier operates the take-up to draw a loop of cord between the eyelets and the upper end of the spindle as indicated in Fig. 23. The carrier 44 then moves downward and to the rear and the spindle carrier support also moves to the rear while the spindle advances so that the end of the cord held by the gripper 4 and the cord leading from the end of the spindle to the take-up and eyelets are brought together as indicated in Fig. 24, the take-up 6 when released by the downward movement of the carrier 44 moving forward to a position determined by the controller stop bar 134 and thus determining the length of the lacing inserted. The gripper 8 then grasps the cord and the cutter 10 severs the cord between the gripper 8 and the upper end of the spindle. The spindle carrier support then moves into the position indicated in Fig. 25 so that a finger 350 on the upper end of the support underlies and supports the cord leading from the gripper 8 to the take-up. At the same time the knotter is moved into position to act upon the ends of the cord between the grippers and eyelets, as also indicated in Fig. 25. The grippers then move forward while the knotter moves downward so that the cords are wrapped about the looper fingers 296, 298, as indicated in Fig. 26. The head carrying the looper fingers then rotates through about three-quarters of a revolution, forming a loop about the fingers close to the edges of the shoe quarters, as indicated in Fig. 27. As the looper fingers come into this position they are opened and the grippers 4 and 8 move toward the rear and downward to carry the cord ends between the looper fingers, as indicated in Fig. 28. The looper fingers then close to grip the cord ends while the grippers 6 and 4 open and return to initial position. The looper fingers then move downward to draw a bite of the cord ends through the loop formed about the fingers and thus finish and tighten the knot as indicated in Fig. 30. The support 44 for the grippers 6 and 8 is then given a downward dip to release the take-up which returns to initial position and the spindle carrier support moves to initial position while the looper fingers open and also return to initial position, the completion of the cycle being indicated in Fig. 31.

The work feeding mechanism for automatically presenting the pairs of eyelets of a series successively to the lace-inserting mechanism comprises two fingers 352 and 354 arranged to engage the upper and lower eyelets of a pair and to align the eyelets and also bring them into alignment with the cord carrying spindle (Figs. 4 to 9). The upper feed finger 352 is secured for vertical adjustment in the forward end of an arm 356 projecting from a block 358 which is secured to the upper end of a rod 360 mounted in a bearing in the feed slide 362. The block fits within a positioning recess in the feed slide and the rod 360 is acted upon by a spring 364 which tends to depress it and hold the block in the recess. The bearing for the rod 360 is provided with a cam slot 366 engaged by a pin 368 projecting from the rod. The cam slot is shaped to swing the feed finger back out of register with the eyelet after the rod has been raised sufficiently to clear the block 358 from its retaining slot. The rod is raised after the movement of the feed slide has brought the finger into register with the cord spindle by a lever 370 which underlies the lower end of the rod and is provided with a roll 372 arranged to be engaged by a cam 374 secured to the cam disk 40. The lever also carries a roll 376 which rides on the periphery of the cam disk and normally supports the lever. The lower feed finger 354 is formed on the horizontal arm of a bell crank lever 378 which is pivotally mounted on the feed slide. The lever is provided with a lateral projection 380 which is acted upon by a latch lever 382 mounted on the feed slide and pressed against the projection by a spring-pressed plunger 384. When the feed finger is in eyelet engaging position the latch lever presses the projection 380 against the under side of a thin plate 386 secured to the feed slide. When the finger is withdrawn from the eyelet the projection 380 acts to depress the latch lever 382 and the end of the lever is so shaped that it will thereafter continue the withdrawal of the feeding finger and hold it in retracted position. The means for retracting the lower feeding finger and for returning it to eyelet engaging position comprises a lever 388, the upper end of which is arranged to engage the bell crank lever 378 as indicated in Figs. 6 and 7. The lever is swung in a direction to retract the feed finger by a pin 390 projecting from the spindle carrier 14 and arranged to strike a cam projection 392 on the lever when the spindle carrier is raised to project the spindle up through the pair of eyelets which have been brought into position by the feeding movement of the feed fingers. When the pin 390 strikes the lever it knocks it to the right in Fig. 7 and this movement of the lever rocks the bell crank lever 378 to withdraw the lower feed finger 354. The swinging movement of the bell crank lever carries the projection 380 thereon into such position that the latch lever 382 continues the swinging movement of the bell crank lever and holds it in the position indicated in Fig. 7. Meanwhile the upper feed finger has been raised as the spindle advances and as the upper movement of the spindle is completed the block 358 leaves its positioning recess and the upper feed finger is then swung back from above the spindle so that it will not interfere with the operation of the thread grippers during the lace-inserting operation. During the lace-inserting operation the feed slide is returned to bring the feed fingers into engagement with the succeeding pair of eyelets to be laced. During the first part of the return movement of the feed slide the upper feed finger is swung forward and lowered so that the block 358 re-enters its positioning recess and the upper feed finger rides along the surface of the upper shoe quarter until it reaches the succeeding eyelet when it drops down into the eyelet. The lower feed finger is also swung up into engagement with the under shoe quarter at the beginning of the return movement of the feed slide by the engagement of the lever 388 with the end of a spring pressed rod 394. The engagement of the lever with the end of the rod swings the lever toward the left from the position indicated in Fig. 7 to the position indicated in Fig. 6, the movement of the lever being arrested by a stop pin 396. During this movement of the lever its upper end swings the bell crank lever in the direction to re-engage the feed finger 354 with the shoe quarter. This movement of the bell crank lever carries its projection 380 into such position with relation to the latch lever 382 that the latch lever presses the feed finger upward against the under surface of the shoe quarter. The feed finger, therefore, travels along the surface of the under shoe quarter until the succeeding eyelet is reached when it moves up into engagement with the eyelet. The two feed fingers thus engage the upper and under eyelets and bring them into accurate register preparatory to feeding the work into position for the insertion of the next lacing.

The feed slide is mounted to slide on a guide bar 398 and is connected with an actuator slide 400 by a spring pressed coupling pin 402, the rounded end of which engages a conical recess in the actuator slide so that the slides will be automatically disconnected to permit continued movement of the actuator slide when the feeding fingers engage the succeeding eyelets and arrest the return movement of the feed slide. The slides will be automatically re-connected when the recess in the actuator slide is again brought into register with the coupling pin during the next feeding stroke of the actuator slide. The feeding devices thus automatically adjust themselves to the spacing of the eyelets by finding each pair of eyelets and advancing them into lace receiving position whatever the spacing between successive pairs of eyelets. The actuator slide is reciprocated through a distance at least as great as the space between the most widely spaced eyelets by a cam lever 404, the upper end of which carries a roll 406 embraced by arms 408 on the actuator slide. The lever also carries a roll 410 engaging a cam groove 412 in the cam disk 40.

In case the shoe upper being laced is provided with a tongue secured along one edge to one of the quarters a tongue remover or depresser acts to remove the tongue from between the eyelets prior to the passage of the cord spindle therethrough. In the construction shown the tongue depresser or remover is in the form of a finger 414 arranged to enter between the upper and under shoe quarters and reciprocating in a path close to the path of the cord spindle (Figs. 4, 6 and 8). The finger is secured upon the upper end of a rod 416, the lower end of which is secured in the lever 418. The lever and finger are held in retracted position by the spring 420 and are advanced to remove the tongue in case it occupies a position between the pair of eyelets brought into lace-inserting position by a slide 422, the front end of which engages the lever and the rear end of which is acted upon by a cam 424 secured to the cam disk 58.

The cam shaft makes one revolution for each lace-inserting and work feeding cycle and the mechanism for actuating the shaft is so constructed that it may be set or adjusted by the operator to turn the shaft through as many revolutions as there are pairs of eyelets in the series to be laced each time that it is thrown into operation by the operator. As shown the cam shaft is driven through a pinion 426 secured to the shaft and engaging a large gear 428 which is keyed to a shaft 430 (Figs. 1, 2 and 3). The driven member 432 of a one-way roller clutch is also keyed to the shaft. The driving member 434 of the one-way clutch is formed on the end of a sleeve which surrounds the hub of the driven member and is mounted within the flange 288 which supports the cam sleeve 286 heretofore described. The driving sleeve 434 of the one-way clutch is connected by screws 436 with a sleeve 438 which carries a spring-pressed clutch bolt 440. The clutch bolt is adapted to engage one of a series of holes 442 formed in the hub of a continuously rotating driving gear 444 and is normally held in retracted position against the force of its spring by a spring-pressed latch pin 446. The latch pin is withdrawn to release the clutch bolt and thus start the machine by a slide 448 having a lip at its upper end overlying a lateral projection on the lower end of the latch pin (Figs. 2, 10 and 11). The slide is forced upward by a spring 450 and may be depressed against the action of the spring through a lever 452, one end of which engages a recess in the slide, and the other end of which is arranged to be engaged by a spring-pressed dog 454 carried by an arm 456 on the end of a rockshaft 458. The rockshaft carries an arm 460 which is slotted at 462 to receive a pin 464 which projects from a rock lever 466. The rock lever is connected through a link 468 to a treadle (not shown) through which the operator may actuate the rockshaft 458 to withdraw the latch pin 446 and thus permit the clutch bolt 440 to engage the driving gear. When the clutch bolt is thus engaged to start the machine the sleeve 436 and the connected driving member 434 of the one-way clutch is rotated and through the one-way clutch rotates the shaft 430 and gear 444 to actuate the cam shaft of the machine.

In order that the machine may be automatically stopped after the cam shaft has made a number of revolutions which may be varied in accordance with the number of pairs of eyelets in the series to be laced means is provided for automatically withdrawing the clutch bolt 440 which may be adjusted in accordance with the number of pairs of eyelets in the series to be laced, and means is also provided for then returning the clutch bolt carrier sleeve and the driving member of the one-way clutch to initial position. The means for automatically withdrawing the clutch bolt comprises a cam 470 arranged to engage a pin 472 projecting from the clutch bolt. The cam 470 may be conveniently secured to the cam sleeve 286 in such relation to the cam which controls the feed for the take-up controlling mechanism that adjustment of the take-up controlling mechanism for a certain number of eyelets in the series to be laced will properly adjust the cam 470 to stop the machine after the cam shaft has made the proper number of revolutions to effect the lacing of this series of eyelets. The means for returning the clutch bolt and driving member of the one-way clutch to initial position after each series of eyelets has been laced and thus position the clutch bolt in proper relation to its withdrawing cam for lacing the succeeding series of eyelets comprises a coil spring 474, one end of which is connected to the bolt carrying sleeve 438, and the other end of which is connected to the fixed flange 288. When the clutch bolt carrier sleeve is rotated to drive the cam shaft it winds up the spring 474 and when the clutch bolt is withdrawn from the driving gear the spring returns the sleeve to initial position, the driving member of the one-way clutch rotating idly during its return rotation.

During the lacing of a series of pairs of eyelets the work may be guided by an edge gage 476 mounted on the feed slide and arranged to engage the edges of the shoe quarters. The shoe quarters are held upon the work supporting plate 118 during the lacing of the eyelets by a work clamp or presser foot 478 formed on the forward end of a lever 480, the rear end of which is acted upon by a spring 482 which presses the clamp against the work. The work clamp may be raised by the operator to permit the removal of a laced upper and the introduction of an unlaced upper and in presenting the new piece of work the cord carrying spindle may be raised above the work supporting plate by the operator to permit the first pair of eyelets to be properly located over the spindle. The means for thus raising the work clamp and cord spindle comprises a link 484, the lower end of which is pivoted to the arm 460 on the starting rock shaft 458 and the upper end of which is connected to one arm of a lever 486. The upper end of the lever 486 is provided with a lateral projection 488 engaging the depending rear end of a bar 490, the forward end of which is connected with an arm of the lever 480. The link 484 also carries a roll 492 arranged to engage a rearwardly projecting arm of the spindle raising lever 32. The parts are so proportioned that a partial depression of the treadle will rock the lever 460 sufficiently to raise the work clamp and to thrust the cord spindle up through the work plate so that the operator may pass the first pair of eyelets over the spindle. Further depression of the treadle releases the clutch bolt and starts the machine. As soon as the clutch bolt has been withdrawn the dog 454 releases the lever 452 so that the latch bolt withdrawing slide is returned to its normal position out of the path of the projection on the latch bolt when it is returned to initial position after the lacing of a pre-determined series of eyelets has been completed and the driving mechanism automatically thrown out. When the treadle is released and the rock shaft 458 returns to normal position the dog 454 will yield to allow it to pass the end of lever 452 and will then snap into position below the end of the lever ready to act thereon when the treadle is again depressed.

While it is preferred to utilize the specific construction and arrangement of parts shown and described it will be understood that this construction and arrangement is not essential to the broader features of the invention and may be varied or modified as found desirable or best suited to the construction and mode of operation of the machine in which these features are to be embodied.

What is claimed is:

1. A lacing machine having, in combination, mechanism for passing a cord through the work and for knotting it to form a closed loop, and means acting automatically to vary the lengths of the loops formed in successive cycles.

2. A lacing machine having, in combination, mechanism for passing a cord through the work and for knotting it to form a closed loop, means acting automatically to vary the length of the loops formed in successive cycles, and work feeding means for spacing the work between successive cycles.

3. A lacing machine having, in combination, mechanism for inserting a connecting lacing in a single pair of eyelets, and means acting automatically to vary the lengths of the lacings inserted in successive lace-inserting cycles.

4. A lacing machine having, in combination, mechanism for inserting a connecting lacing in a single pair of eyelets, and means for determining the length of the lacing adjustable to vary the lengths of lacings inserted in successive lace-inserting cycles.

5. A lacing machine having, in combination, mechanism for inserting a connecting lacing in a single pair of eyelets, and means for determining the length of the lacing adjustable to progressively vary the length of lacings inserted in a pre-determined series of lace-inserting cycles.

6. A lacing machine having, in combination, mechanism for inserting a connecting lacing in a single pair of eyelets, and means for determining the length of the lacing adjustable to secure lacings of equal or of varying lengths in successive lace-inserting cycles.

7. A lacing machine having, in combination, mechanism for inserting a connecting lacing in a single pair of eyelets, and means for securing a progressive variation in length from the first to the last lacing inserted in a series of lace-inserting cycles.

8. A lacing machine having, in combination, lace-inserting mechanism, and means for progressively varying the lengths of lacing inserted in successive lace-inserting cycles adjustable to determine the total variation between the first and last lacings inserted in a series of lace-inserting cycles.

9. A lacing machine having, in combination, lace-inserting mechanism, and means for progressively varying the lengths of lacings inserted in successive lace-inserting cycles adjustable to determine the total variation between the first and last lacings inserted in a series of lace-inserting cycles and to determine the number of lace-inserting cycles in the series.

10. A lacing machine having, in combination, lace-inserting mechanism, means for progressively varying the lengths of lacing inserted in successive lace-inserting cycles adjustable to determine the total variation between the first and last lacings inserted in a series of lace-inserting cycles, and means indicating the space between the edges of the shoe quarters at the first and last eyelets resulting from the adjustment.

11. A lacing machine having, in combination, lace-inserting mechanism including a measurer for determining the length of the lacing inserted in each lace-inserting cycle, controlling mechanism for the measurer adjustable for different lengths of lacings and for varying the lengths in successive lace-inserting cycles.

12. A lacing machine having, in combination, lace-inserting mechanism including a measurer for determining the length of the lacing inserted in each lace-inserting cycle, devices for indicating the space between the edges of the shoe quarters at the first and at the last laced eyelets resulting from a given adjustment, and actuating means for the controlling mechanism adjustable to vary its action on the controlling mechanism in accordance with the number of lace-inserting cycles intervening between the first and the last.

13. A lacing machine having, in combination, lace-inserting mechanism including a take-up for determining the length of the lacing inserted in each lace-inserting cycle, a controller for the take-up, and means for setting the controller for each cycle adjustable to maintain or vary its setting in successive cycles.

14. A lacing machine having, in combination, lace-inserting mechanism including a take-up for determining the length of the lacing inserted in each lace-inserting cycle, a controller for the take-up, a guideway, the ends of which are independently adjustable, a member movable along the guideway and connected to set the controller, and means for shifting the member along the guideway for each lace-inserting cycle.

15. A lacing machine having, in combination, lace-inserting mechanism including a take-up for determining the length of the lacing inserted in each lace-inserting cycle, a controller for the take-up, a guideway, the ends of which are independently adjustable, a member movable along the guideway and connected to set the controller, and means for shifting the member along the guideway for each lace-inserting cycle adjustable to vary the length of each shifting movement in accordance with the number of eyelets in the series to be laced.

16. A lacing machine having, in combination, mechanism for successively lacing a series of pairs of eyelets, and means for removing a tongue from between the eyelets.

17. A lacing machine having, in combination, lace-inserting mechanism, means for presenting a series of pairs of eyelets successively to the lace-inserting mechanism, and a tongue remover.

18. A lacing machine having, in combination, lace-inserting mechanism, means for engaging a pair of eyelets and feeding them into lace-receiving position, and a tongue remover.

19. A lacing machine having, in combination, lace-inserting mechanism for inserting a connecting lacing in a single pair of eyelets, mechanism for feeding pairs of eyelets successively into lace-receiving position, and a tongue remover.

20. A lacing machine having, in combination, mechanism for passing a lacing cord through a pair of eyelets, and means for removing a tongue from between the eyelets.

21. A lacing machine having, in combination, a cord carrying spindle adapted to pass through a pair of eyelets, and a tongue remover adapted to clear the space between the eyelets.

22. A lacing machine having, in combination, lace inserting mechanism and work feeding means operating to enter an eyelet and feed it into register with said mechanism.

23. A lacing machine having, in combination, lace-inserting mechanism, and separate feeding means for successively entering a series of eyelets and feeding them in succession into lace-receiving position.

24. A lacing machine having, in combination, lace-inserting mechanism, and a separate reciprocating feeding finger for successively entering a series of eyelets and feeding them in succession into lace-receiving position.

25. A lacing machine having, in combination, a cord carrying spindle adapted to pass through eyelets, a feeding finger adapted to enter eyelets, and mechanism for actuating the finger to enter an eyelet, feed it into register with the spindle and then withdraw from the path of the spindle.

26. A lacing machine having, in combination, lace-inserting mechanism, a feeding finger mounted to ride along the surface of the work and to enter an eyelet therein, a carrier for the finger, a reciprocating actuator, and an automatically disconnecting and re-connecting coupling between the actuator and carrier.

27. A lacing machine having, in combination, a cord carrying spindle for passing a cord through eyelets, a feeding finger mounted to ride along the surface of the work and to enter an eyelet therein, and a reciprocating carrier for the finger.

28. A lacing machine having, in combination, a cord carrying spindle for passing the cord through eyelets, two opposed feeding fingers constructed to enter a pair of eyelets, and means for reciprocating the fingers.

29. A lacing machine having, in combination, a cord carrying spindle, two opposed feeding fingers arranged to ride along opposite sides of the work and to enter eyelets therein, and means for reciprocating the fingers.

30. A lacing machine having, in combination, a spindle for carrying a cord through eyelets, a gripper for grasping the end of the cord, mechanism for withdrawing the spindle and for relatively moving the spindle and gripper to draw a length of cord through the spindle and to bring the cord end close to the cord leading from the spindle to the eyelets, means for gripping the cord adjacent to the spindle and for severing it between the spindle and gripper, and a knotter for tying the cord ends.

31. A lacing machine having, in combination, a spindle for carrying a cord through eyelets, a gripper for grasping the end of the cord, mechanism for withdrawing the spindle and for relatively removing the spindle and gripper to draw a length of cord through the spindle and to bring the cord end close to the cord leading from the spindle to the eyelets, a take-up for determining the length of cord drawn through the spindle, means for gripping the cord adjacent to the spindle and for severing it between the gripper and spindle, and a knotter for tying the cord ends.

32. A lacing machine having, in combination, lace-inserting mechanism, work feeding mechanism, actuating mechanism therefor, stop mechanism for throwing out the actuating mechanism after a series of lace-inserting and work feeding cycles, and means for varying the lengths of the lacings inserted in successive cycles.

33. A lacing machine having, in combination, lace-inserting mechanism, work feeding mechanism, actuating mechanism therefor, stop mechanism for throwing out the actuating mechanism after a series of lace-inserting and work feeding cycles adjustable to vary the number of cycles in the series, and means for varying the lengths of lacings inserted in successive cycles adjustable to secure a given total variation between the first and last lacing inserted.

34. A lacing machine having, in combination, lace-inserting and work feeding mechanism, actuating mechanism therefor, stop mechanism for throwing out the actuating mechanism, means for varying the lengths of lacings inserted in successive cycles, and means for setting the stop mechanism to throw out the actuating mechanism after a given number of lace-inserting cycles, and for simultaneously setting the length varying means for that number of lacings.

35. A lacing machine having, in combination, mechanism for inserting a lacing cord in a pair of eyelets and tying the cord to form a connecting lacing, and means for feeding pairs of eyelets successively to the inserting and tying mechanism.

36. A lacing machine having, in combination, lace inserting and knot tying mechanism, and means for presenting pairs of eyelets successively thereto.

37. A lacing machine having, in combination, lace inserting and knot tying mechanism, and means for relatively moving the work and said mechanism to present a series of pairs of eyelets to the mechanism.

38. A lacing machine having, in combination, means for carrying a cord through an eyelet, and means operating to enter an eyelet and feed it into register with the cord carrying means.

39. A lacing machine having, in combination, a spindle for carrying a cord through eyelets, a gripper for grasping the end of the cord, mechanism for withdrawing the spindle and for relatively moving the spindle and gripper to draw a length of cord through the spindle and to bring the cord end close to the cord leading from the spindle to the eyelets, a knotter for tying the cords, and means for supporting the cord between the eyelets and the edge of the work.

40. A lacing machine having, in combination, a spindle for carrying a cord through eyelets, a gripper for grasping the end of the cord, mechanism for withdrawing the spindle and for moving the spindle and gripper transversely and toward each other to bring the cord end close to the cord leading from the spindle to the eyelets, and means for severing and knotting the cords.

41. A lacing machine having, in combination, a spindle for carrying a cord through eyelets, a gripper for grasping the end of the cord, mechanism for withdrawing the spindle and for relatively moving the spindle and gripper to draw a length of cord through the spindle and to bring the cord end close to the cord leading from the spindle to the eyelets, means for gripping the cord adjacent to the spindle and for severing it between the spindle and gripper, looping fingers for forming a loop in the cord between the gripper and eyelets, means for moving the grippers to carry the cords between the fingers, and mechanism for actuating the fingers to draw the cords through the loop.

42. A lacing machine having, in combination, a reciprocating and laterally movable cord carrying spindle, a gripper having jaws for gripping the end of the cord passed through an eyelet by the spindle and for gripping the cord between the spindle and the eyelets, means for severing the cord between the spindle and the gripper, and a knotter for knotting the cords between the gripper and the eyelets.

HERBERT E. ENSLIN.